J. & E. POPHAM.
PEG-FLOAT.
No. 180,921. Patented Aug. 8, 1876.
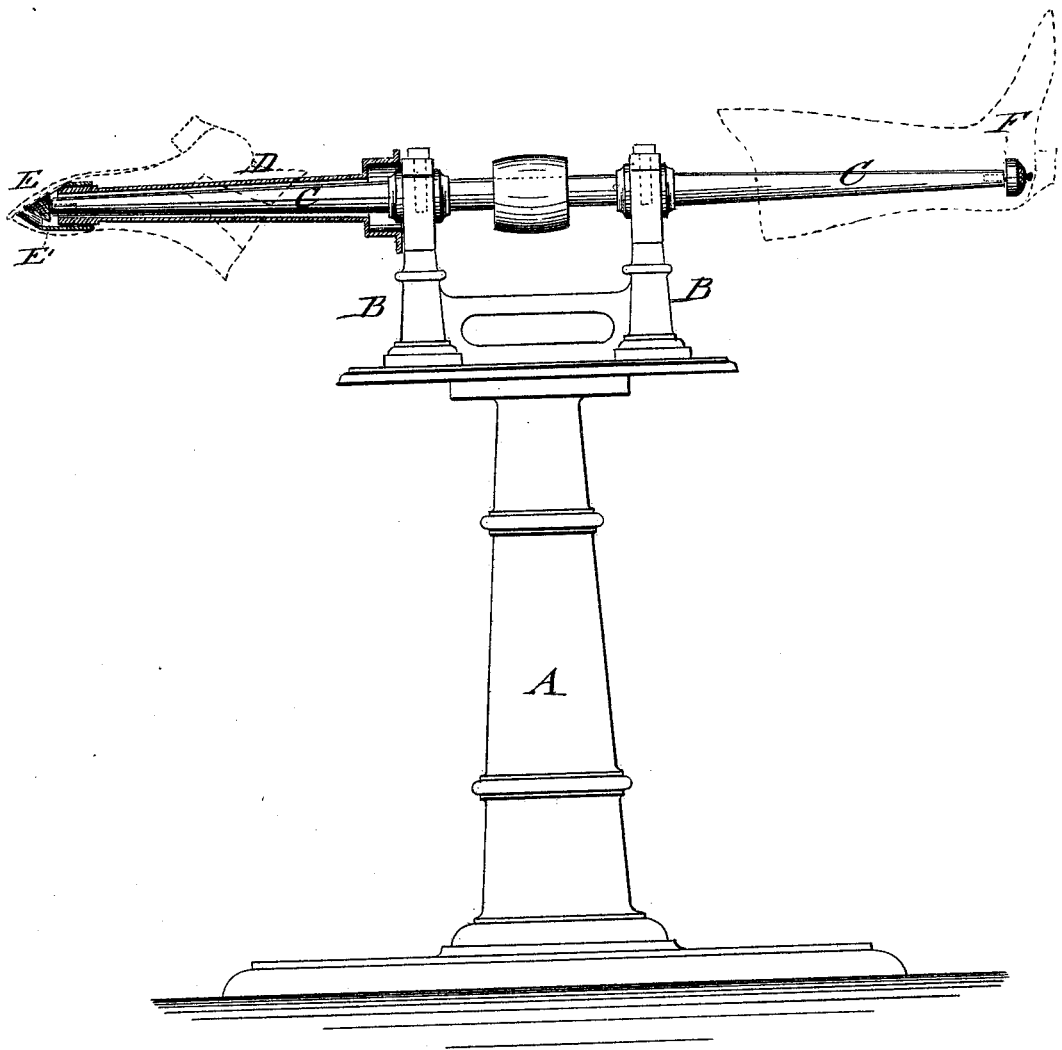
WITNESSES:
Chas. Nida
John Goethals
INVENTOR:
J. Popham
E. Popham
BY
ATTORNEYS.

UNITED STATES PATENT OFFICE.

JAMES POPHAM AND EBENEZER POPHAM, OF MONTREAL, QUEBEC, CANADA.

IMPROVEMENT IN PEG-FLOATS.

Specification forming part of Letters Patent No. 180,921, dated August 8, 1876; application filed May 22, 1876.

*To all whom it may concern:*

Be it known that we, JAMES POPHAM and EBENEZER POPHAM, of Montreal, in the Province of Quebec and Dominion of Canada, have invented a new and Improved Peg-Breaking Machine, of which the following is a specification:

The accompanying drawing represents a side elevation of our improved peg-breaking machine.

The invention relates to an improved machine for breaking or cutting the projecting ends of pegs from the insoles of boots and shoes; and consists of a grooved cutter, of pyramidal or cylindrical shape, attached to the end of a rapidly-revolving shaft, in connection with a protecting guard or casing.

In the drawing, A represents a cast-iron base or stand, that supports pillars or bearings B, in which the horizontal cutter-shaft C revolves. The shaft C is revolved at great speed, so as to exert, by the cutting-tools at the ends, more of a cutting than a breaking action. The shaft C is extended at both sides of the bearings B, and provided with cutters at both ends, one serving to cut off the pegs in shoes and gaiters, the other in long boots. That side of shaft C which is used for cutting off the pegs of shoes of all sizes is incased by a horn, D, and has a cutter, E, of pyramidal shape, affixed to the end. The cutter E has a series of grooves, forming wedges or blades, that do not bruise or break the protruding ends of the pegs, but cut them off neatly and cleanly close to the insole. A guard, E', incloses the base and apex of cutter E, leaving one side free, along which the sole is run, so that, as soon as the cutter reaches the insole, it cannot go deeper.

In cleaning lined work the cutter is partially covered with a shield, so that the lining is perfectly protected from the action of the teeth or blades of the cutter.

The cutter F, at the opposite end of shaft C, serves to cut off the pegs of long boots, and is for this purpose made cylindrical, with grooves and cutting-blades at the circumference, for cleaning the peg ends from the sides instead of downward, and with the pyramidal cutter.

One and the same machine may thus be applied, without any special adjustment, to every variety of pegged work, from children's wear to the largest and strongest goods in men's sizes.

We do not claim, broadly, a rotating peg-cutter provided with radial grooves and cutting-ribs; but,

Having thus described our invention, what we claim as new, and desire to secure by Letters Patent, is—

The combination of the revolving shaft, having a grooved pyramidal cutter, with an incasing-horn and guard, leaving cutter exposed at upper side, to protect insole and leather, substantially as specified.

JAMES POPHAM.
EBENEZER POPHAM.

Witnesses:
JOHN J. MACLAREN,
   *Of Montreal, Advocate.*
N. W. TRENHOLM,
   *Of Montreal, Advocate.*